(12) United States Patent
Reid (10) Patent No.: US 7,133,537 B1
(45) Date of Patent: Nov. 7, 2006

(54) METHOD AND APPARATUS FOR TRACKING A MOVING OBJECT

(75) Inventor: John Reid, Glebe Tasmania (AU)

(73) Assignee: IT Brokerage Services Pty Limited, Mason (AU)

( * ) Notice: Subject to any disclaimer, the term of this patent is extended or adjusted under 35 U.S.C. 154(b) by 0 days.

(21) Appl. No.: 09/979,843

(22) PCT Filed: May 26, 2000

(86) PCT No.: PCT/AU00/00604

§ 371 (c)(1),
(2), (4) Date: Apr. 12, 2002

(87) PCT Pub. No.: WO00/73996

PCT Pub. Date: Dec. 7, 2000

(30) Foreign Application Priority Data

Aug. 28, 1999 (AU) .................................... PQ0616
Feb. 9, 2000 (AU) .................................... PQ5521

(51) Int. Cl.
*G06K 9/00* (2006.01)

(52) U.S. Cl. ...................... 382/103; 382/107; 382/288; 382/291; 382/294; 348/169; 348/172

(58) Field of Classification Search ................ 382/164, 382/165, 103, 107, 173, 284, 288, 291, 294; 348/169–172
See application file for complete search history.

(56) References Cited

U.S. PATENT DOCUMENTS

| 4,550,435 | A | * | 10/1985 | Hayman ...................... 382/103 |
| 4,958,224 | A | * | 9/1990 | Lepore et al. .............. 348/171 |
| 5,034,986 | A | * | 7/1991 | Karmann et al. ........... 382/103 |
| 5,181,254 | A | * | 1/1993 | Schweizer et al. .......... 382/100 |
| 5,185,671 | A | * | 2/1993 | Lieberman et al. ...... 348/229.1 |
| 5,640,468 | A | * | 6/1997 | Hsu .......................... 382/190 |
| 6,079,862 | A | * | 6/2000 | Kawashima et al. ........ 382/103 |

\* cited by examiner

*Primary Examiner*—Bhavesh M. Mehta
*Assistant Examiner*—Christopher Lavin
(74) *Attorney, Agent, or Firm*—Miles & Stockbridge P.C.; Edward J. Kondracki (57) ABSTRACT

A method of tracking an object moving relative to a scene includes generating a background image by acquiring a plurality of images of the scene and comparing a pair of comparison images with the background image. Potential objects are matched by comparing spatial characteristics of potential objects of a following image of the pair of comparison images with spatial characteristics of potential objects of a preceding image of the pair of comparison images to match potential objects in the following image to potential objects in the preceding image and each matched potential object is treated as a moving object to thereby track the movement of each moving object relative to said scene.

38 Claims, 6 Drawing Sheets

METHOD AND APPARATUS FOR TRACKING A MOVING OBJECT

FIELD OF THE INVENTION

The present invention relates to a method and apparatus for tracking a moving object.

BACKGROUND OF THE INVENTION

There is an extensive literature concerned with the analysis of changing images and with the characterization of motion within images. Much of this work is based on the concept of optical flow. This allows the continuity equation of fluid dynamics to be applied directly to image processing problems. Thus much of the extensive corpus of knowledge dealing with the manipulation of the partial differential equations used in fluid dynamics can be brought to bear on image processing problems.

This approach has some serious shortcomings. The underlying assumptions that the domain of investigation, in this case the image intensity function, is everywhere continuous and differentiable is rarely true in practice. The image intensity function is usually a function on a discrete domain of subscript values not on a continuum and rapid changes in intensity called "edges" are common in most images of interest. Such rapid changes in intensity preclude the use of Taylor's theorem in establishing the underlying equations of the optical flow method. The practical consequence of this is that optical flow methods have not proven to be particularly successful in the processing of images. This is hardly surprising when one considers that the very features that facilitate the alignment of images at an intuitive level, that is, sharp edges, have been sacrificed at the outset.

Another approach is to divide the image domain into zones and detect the presence or absence of intensity differences within each zone. This method is limited by the coarseness of this subdivision, which decreases the spatial resolution, and by its inability to independently track two different objects when they pass one another.

Further, changes in pixel intensity can also be brought about by causes other than objects moving in the scene. In particular changes in scene illumination will cause significant changes in image pixel intensity. These intensity changes are then passed to downstream algorithms and give rise to spurious "moving objects" or false alarms. To some extent brightness compensating cameras ameliorate the problem but they cannot compensate for brightness changes that vary across the image.

SUMMARY OF THE INVENTION

The invention provides a method of tracking an object moving relative to a scene, the method including:

(a) generating a background image by acquiring a plurality of images of the scene, dividing each image into a plurality of background image elements, determining a value of a characteristic of each said background image element for each image to obtain a set of values, and determining from said set of values a background value for each of said background image elements;

(b) comparing a pair of comparison images with said background image by:

(i) acquiring a pair of comparison images, dividing each said comparison image into a plurality of comparison image elements corresponding to respective ones of the background image elements, and determining a comparison value of said characteristic for each of said comparison image elements;

(ii) comparing each said comparison value with said background value of said corresponding background image element to determine whether said comparison value is sufficiently similar to said background value to thereby determine whether or not each said comparison image element is sufficiently similar to the corresponding background image element; and (iii) determining from which comparison image elements are not sufficiently similar to the corresponding background image element which comparison image elements relate to potential objects and determining a spatial characteristic of each said potential object;

(c) matching potential objects in said pair of comparison images by comparing spatial characteristics of potential objects of a following image of said pair of comparison images with spatial characteristics of potential objects of a preceding image of said pair of comparison images to match potential objects in the following image to potential objects in the preceding image; and (d) treating each matched potential object as a moving object to thereby track the movement of each said moving object relative to said scene.

The invention also provides a method of reducing the effect of variations in intensity of illumination of a scene, the method including:

converting intensity values of image elements of images acquired of said scene to a logarithmic scale of intensity to thereby form a log-intensity image; and filtering said log-intensity image with a high-pass spatial filter in order to create an output image of said scene which is independent of the illumination of the scene.

The invention also provides a method of tracking an object added to or removed from a scene, the method including:

(a) generating a series of background images of the scene by acquiring for each background image a plurality of images of said scene, dividing each said image into a plurality of background image elements, determining a value of a characteristic of each background image element for each image to obtain a set of values and determining from said set of values a background value for each of said background image elements;

(i) comparing each new background value with an old background value of a corresponding background image element of an old background image which precedes said new background image by a number of background images to determine whether said new value is sufficiently similar to said old value to thereby determine whether or not each new image element is sufficiently similar to the corresponding old image element;

(ii) determining from which new image elements are not sufficiently similar to the corresponding old image element which new image elements relate to potential objects and determining a spatial characteristic of each said potential object;

(b) matching potential objects in consecutive background images by comparing spatial characteristics of potential objects of a following background image of said consecutive images with spatial characteristics of potential objects of a preceding background image of said consecutive background images to match potential objects in the following image to potential objects in the preceding image; and (c) treating each matched potential object as an object added to or removed from the scene.

The invention also provides apparatus for tracking an object moving relative to a scene, the apparatus including:

(a) image acquisition means;

(b) background image generation means for generating a background image from a plurality of images of the scene acquired by said image acquisition means, said background image generation means dividing each image into a plurality of background image elements, determining a value of a characteristic of each said background image element for each image to obtain a set of values, and determining from said set of values a background value for each of said background image elements;

(c) image comparison means for comparing a pair of comparison images with said background image by:

(i) dividing each image of a pair of comparison images acquired by said image acquisition means into a plurality of comparison image elements corresponding to respective ones of the background image elements, and determining a comparison value of said characteristic for each of said comparison image elements;

(ii) comparing each said comparison value with said background value of said corresponding background image element to determine whether said comparison value is sufficiently similar to said background value to thereby determine whether or not each said comparison image element is sufficiently similar to the corresponding background image element; and (iii) determining from which comparison image elements are not sufficiently similar to the corresponding background image element which comparison image elements relate to potential objects and determining a spatial characteristic of each said potential object;

(d) object matching means for matching potential objects in said pair of comparison images by comparing spatial characteristics of potential objects of a following image of said pair of comparison images with spatial characteristics of potential objects of a preceding image of said pair of comparison images to match potential objects in the following image to potential objects in the preceding image; and (e) object tracking means which treats each matched potential object as a moving object to thereby track the movement of each said moving object relative to said scene.

The invention also provides apparatus for reducing the effect of variations in intensity of illumination of a scene, the apparatus including:

logarithmic conversion means for converting intensity values of image elements of images acquired of said scene to a logarithmic scale of intensity to thereby form a log-intensity image; and a high-pass spatial filter for filtering said log-intensity image in order to create an output image of said scene which is independent of the illumination of the scene.

The invention also provides apparatus for tracking an object added to or removed from a scene, the apparatus including:

(a) image acquisition means;

(b) background image generation means for generating a series of background images of the scene, said background image generation means generating each background image from a plurality of images of said scene acquired by said image comparison means, said background image generation means dividing each said image into a plurality of background image elements, determining a value of a characteristic of each background image element for each image to obtain a set of values and determining from said set of values a background value for each of said background image elements;

(i) background comparison means for comparing each new background value with an old background value of a corresponding background image element of an old background image which precedes said new background image by a number of background images to determine whether said new value is sufficiently similar to said old value to thereby determine whether or not each new image element is sufficiently similar to the corresponding old image element;

(ii) determining from which new image elements are not sufficiently similar to the corresponding old image element which new image elements relate to potential objects and determining a spatial characteristic of each said potential object;

(c) object matching means for matching potential objects in consecutive background images by comparing spatial characteristics of potential objects of a following background image of said consecutive images with spatial characteristics of potential objects of a preceding background image of said consecutive background images to match potential objects in the following image to potential objects in the preceding image; and (d) object tracking means which treats each matched potential object as an object added to or removed from the scene.

BRIEF DESCRIPTION OF THE DRAWINGS

In order that the present invention may be understood, examples of an embodiment of two aspects of the invention will be described with reference to the accompanying drawings. In the drawings.

DESCRIPTION OF THE PREFERRED EMBODIMENTS

The preferred embodiment of the first aspect of the present invention is particularly suited to cases where the moving objects account for only a small proportion of the intensity variance of the image. The process operates upon a regularly timed sequence of images of one or more objects moving against a static background. The image data generated by an image acquisition means in the form of a camera or video recorder passed by means of a video capture card and its associated software to a computer programmed to carry out the object tracking method. Software to carry out the method can be generated by any skilled programmer and therefore description of suitable software is not included herein.

Where the objects being tracked are humans, 5 to 6 frames per second is sufficient to enable an object to be tracked. The frame rate can be varied in accordance with the anticipated maximum velocity of the objects being tracked.

Figure 1:
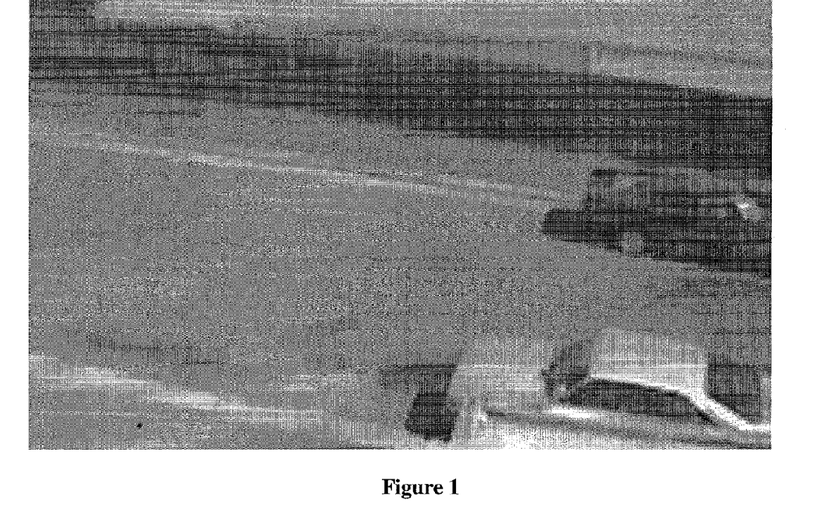
FIG. 1 shows a background image of a street scene.

A background image such as that shown in FIG. 1 is prepared by a background generation means from a sequence of background images of the scene. Each background image is divided into a plurality of background image elements. The background image elements are chosen to be each pixel of the image but could be a group of pixels. A background value of a characteristic of the background image is determined for each pixel. In the preferred embodiment, the characteristic of the background image is chosen to be the intensity of the image. Thus there is a time series of intensity values for each pixel. Each value in the time series corresponds to one image in the sequence. This time series is binned to form a sample distribution of intensities for the given pixel and the mode or most common value of intensity is found for each pixel. This value is assigned to the corresponding pixel in the background image which thus constitutes background data against which other images can be compared. The mean or median can be used but are not as efficient. Objects that are moving in the scene will affect the values in the outlying bins of the sample distribution of intensities as they pass by the pixel but they will not, in general, affect the mode. Hence most moving objects will be invisible and only fixed and slowly moving objects will affect the background data represented by the background image. That is, the background image is effectively an array of background values which can be used as a basis of comparison.

Two "confidence limit images" or "range images" are derived by the background image generation means from the background image, a "high range image" and a "low range image". For each pixel in the background image, an intensity value is added to form the high range image and an intensity value is subtracted to form the low range image. The value to be added and subtracted may be a constant derived from a prior knowledge of the camera noise statistics or it may be estimated for each pixel from the sample distribution of intensity values for that pixel by the usual methods of estimating confidence limits.

More specifically, the modal and upper and lower confidence limit images are calculated as follows. A modal image is constructed from a sequence of (say) 50 images as follows—For each pixel, an array of (say) 64 "bins" is set up and the bins are assigned zero value. The intensity value (which must lie between 0 and 255) for that pixel for each image is used to calculate a bin number, j, by dividing the intensity, I, by 4 and bin(j) is incremented by one. After 50 images have been processed in this way there is a numerical distribution of intensity for each pixel. The mode (most common value) of intensity for each pixel is found to form a background or "modal" image. The mode is chosen rather than the mean because outliers caused by objects moving past the pixel corrupt the mean. This gives rise to a "double exposure" effect in the background image. On the other hand outliers do not affect the mode providing there are not too many of them and passing objects are rendered invisible. The median would probably do just as well but the mode is easier to calculate.

When the mode is being computed the upper and lower confidence limits for each pixel are calculated at the same time from the same numerical distribution of intensity values by finding the root mean square of the difference between the binned intensities and the mode. This root mean square value is very close to but not quite the same thing as the standard deviation, the latter being the root mean square difference from the mean. Adding and subtracting twice the root mean square to the mode give the upper and lower confidence limits respectively. These values will be similar to the 95% confidence limits found by assuming a Gaussian distribution and using twice the sample standard deviation or those found using Student's t-test. Because of the presence of outliers, which equate to objects which the technique of the present invention detects, a Gaussian assumption is not justified.

Figure 2:
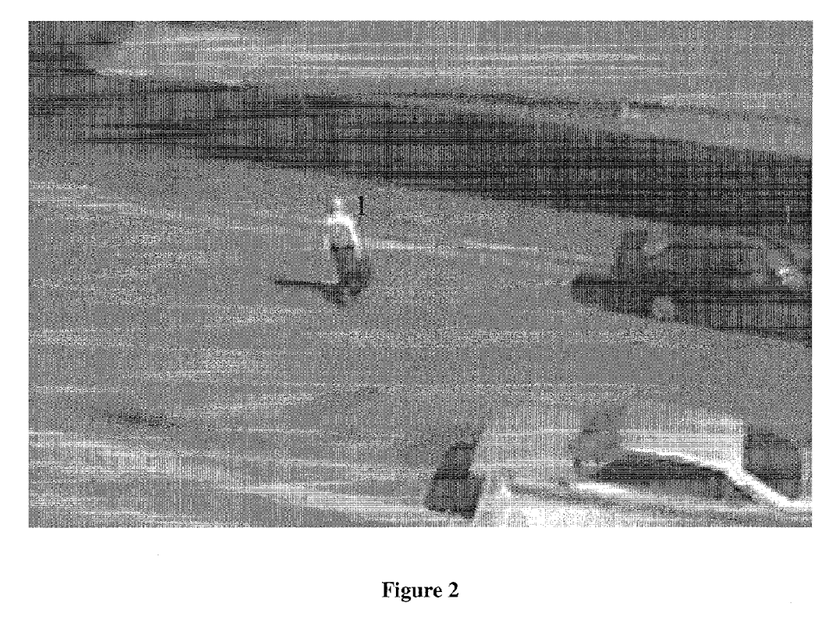
FIG. 2 shows a new image which contains a human figure.
Figure 3:
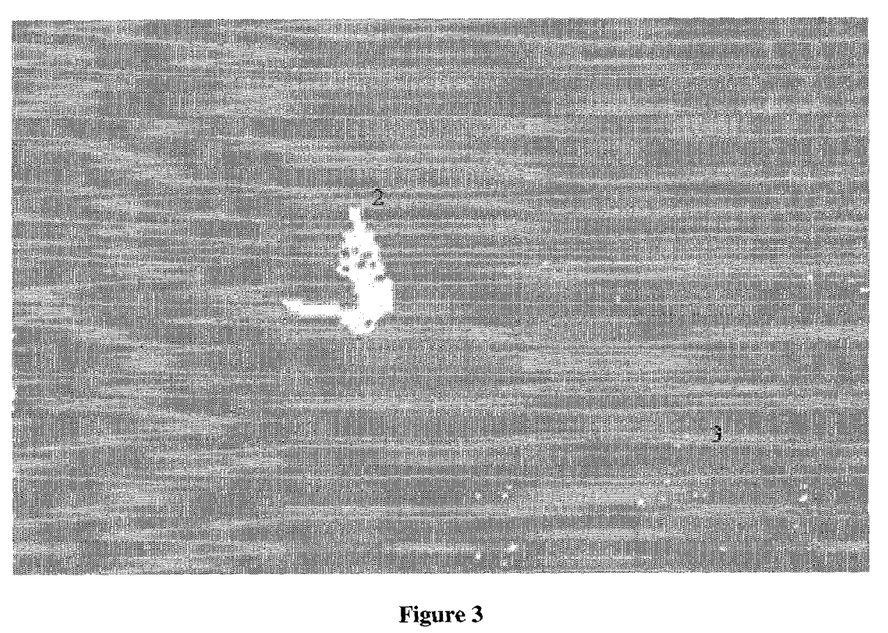
FIG. 3 shows the Boolean pixel array that is formed when the new image is tested against the range images.

Once the two background range images have been formed each new comparison image acquired by the image acquisition means, such as that shown in FIG. 2, is compared by an image comparison means with the background image to find potential new or moving objects in the scene. This is done pixel by a pixel—i.e. each pixel in the comparison image has its intensity determined by the image comparison means and compared with the intensity of the corresponding pixel in the background image to determine whether the comparison value of intensity is sufficiently similar to the background value of intensity. If the intensity of a pixel in the incoming frame lies between the intensities of the same pixel in the low range and high range images then the pixel is designated as a "False" pixel. If it lies outside the range then the pixel is designated as a "True" pixel, that is, one which is significantly different from the background image. This process generates a two-dimensional Boolean pixel array of "True" and "False" pixels. The Boolean pixel array generated by the image in FIG. 2 is shown in FIG. 3. The Boolean pixel array contains a large area of True cells 1 which are caused by the presence of the human figure in FIG. 2—i.e. by the presence of a moving object. It also contains true cells 2 which are due to noise in the new image. Initially each pixel that falls outside the range is presumed to relate to an object. Further processing of the pixels by a noise reduction means and the object matching means progressively eliminates pixels falling outside the range that do not relate to objects.

Figure 4:
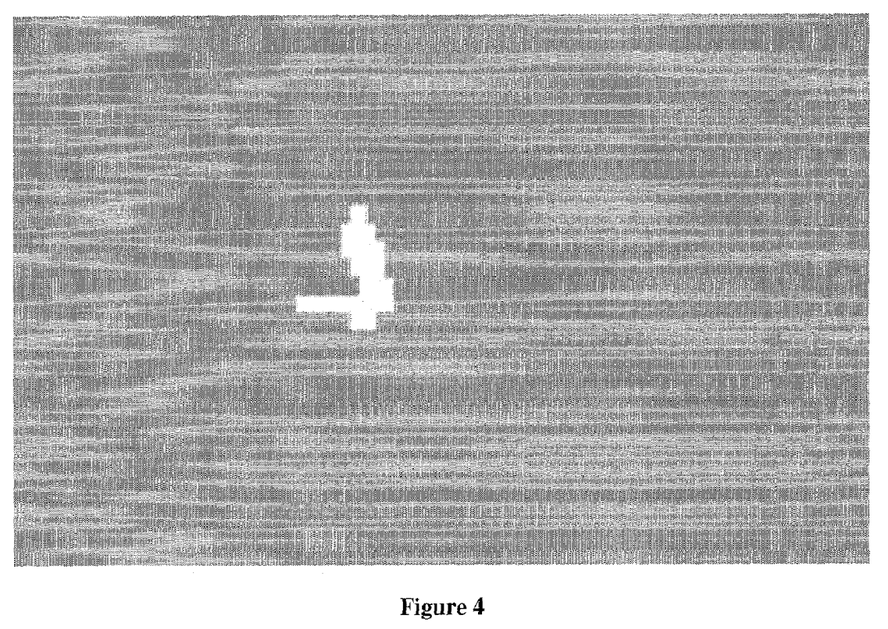
FIG. 4 shows a Boolean tile array formed from the Boolean pixel array.

The image plane is then uniformly subdivided by noise reduction means into groups of pixels called tiles, where each tile contains an array of adjacent pixels. The Boolean pixel array is then used to generate a Boolean tile array by designating those tiles with more than, say, one half of their pixels true as "True" tiles and the rest as "False". This tiling process is not essential but it greatly increases the speed of the ensuing steps and also reduces noise by reducing the number of image elements which are presumed to relate to objects and hence reducing the number of image elements treated as objects. The Boolean tile array derived from the Boolean pixel array of FIG. 3 is shown in FIG. 4.

Figure 5:
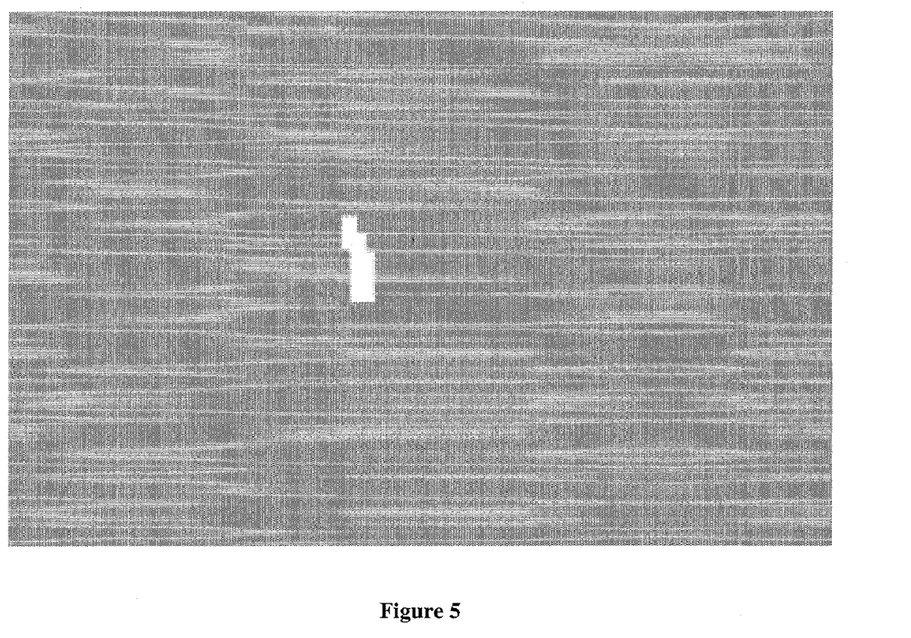
FIG. 5 shows a smoothed Boolean tile array formed by smoothing the Boolean tile array.

The Boolean tile array may be smoothed by the noise reduction means to form a smoothed Boolean tile array. A new tile array is prepared which has the same dimensions as the Boolean tile array. Each cell in the Boolean tile array is tested to see how many of the surrounding tiles are true. If the number exceeds a preset threshold the corresponding cell in the smoothed Boolean tile array is set to True and to False otherwise. This is similar to passing a 2 dimensional moving average filter over numerical data. It is not essential but helps to eliminate protrusions such as shadows. The smoothed Boolean tile array derived from FIG. 4 is shown in FIG. 5.

The tiles in the smoothed Boolean tile array are then formed into groups of proximate tiles by the noise reduction means. A true tile that lies within a predefined distance of a given true tile is allocated to the same "space group". Each space group is treated as an object by an object matching means. True tiles do not necessarily have to touch to belong to the same group (hence they are "proximate" rather than "contiguous"). The proximity thresholds, the predefined distances in the x and y directions, which define proximity, may be functions of position in the image and of the scene geometry. They may be made larger near the bottom of the image where objects in the scene are closer to the camera. The proximity thresholds may also be varied according to the type of object being viewed and may be set differently if vehicles are being viewed rather than people.

Once the space groups have been formed their statistical properties are computed by the object matching means in order to obtain a spatial characteristic for each object. These properties include the centroid of the group and its spatial standard deviations in the x and y directions in units of inter-pixel distance.

Tens of thousands of pixel values in the incoming frame are reduced by 3 or 4 orders of magnitude to a much smaller number of space group statistics; bitmap data has been converted to vector data.

Each space group is assumed to correspond to one or more real objects moving in the scene. Since solid objects are constrained by the laws of physics to move smoothly from frame to frame, proximity in time is as important as proximity in space when tracking real objects. For this reason space groups which are by their nature associated only with a single frame are incorporated into "time groups" which persist over many frames. The space groups of each new frame are compared with time groups derived from preceding frames to see if any matches can be found. A time group may consist simply of a single space group from a single frame or it may persist for many consecutive frames. Time groups which do not persist for a number of frames are discarded and not treated as objects. In the preferred embodiment time groups are discarded if they don't persist for more than three frames.

A space group is allocated to a time group if the centroid of the space group is sufficiently close to the centroid of the time group and if the spatial standard deviations of the space group are sufficiently close to the spatial standard deviations of the time group. Space groups which are matched to time groups are used by the object tracking means to track moving objects.

If a single match is found by the object matching means the space group is added to that time group. If more than one space group matches a time group the one with the best match is chosen. If no space groups match an existing time group, the time group is killed off. If no time groups match a space group a new time group is started. When a space group is added to a time group the statistics of the space group are used to update the statistics of the time group. The centroid of the space group is added to a list of coordinate pairs associated with the time group and its spatial variance data are incorporated into the spatial variance data of the time group. The distance matching thresholds are not absolute but are based on the spatial size of the groups as summarized by their spatial standard deviations. The size matching criterion is based on a "matching factor" which is a function of the ratio of the spatial standard deviations of the space group to those of the candidate time group. More specifically, the centroid and spatial standard deviation of each space group is calculated first. The centroid and spatial standard deviations of each time group are calculated from the sums and sums of squares of its member space groups.

The spatial standard deviations are the square roots of the spatial variances in the x and y directions.

When a candidate space group is tested for a match with a given time group it has to pass all four of the following tests before it is considered as a possible match—

1. Is the x-coordinate of the centroid of the space group (i.e. the mean x-value of the group) closer than the x-distance-tolerance to the x-coordinate of the centroid of the time group?
2. Is the y-coordinate of the centroid of the space group closer than the y-distance-tolerance to the y-coordinate of the centroid of the time group?
3. Is the x-size-factor less than the size factor threshold?
4. Is the y-size-factor less than the size factor threshold?

These tests can be expressed as follows:

$$(x_s - x_t)^2 < G \max(s_x, t_x) \tag{1}$$

$$(y_s - y_t)^2 < G \max(s_y, t_y) \tag{2}$$

$$|t_x - s_x|/(t_x + s_x) < F \tag{3}$$

$$|t_y - s_y|/(t_y + s_y) < F \tag{4}$$

where $x_s$ is the x-coordinate of the centroid of the space group, $x_t$ is the x-coordinate of the centroid of the time group, $s_x$ is the x-variance of the space group, $t_x$ is the x-variance of the time group, G is a constant between 2 and 10 and F is a constant between 0.5 and 1.5. The y-direction quantities are similarly defined.

Optimum values of G and F have been found by the inventors to be 6.0 and 1.0 respectively.

Time groups can be visualized as groups of true tiles in a 3 dimensional space in which the dimensions are the pixel coordinates and the frame number. When a time group is terminated, that is when no space group can be found which matches it or when it has persisted for a preset number of frames (usually ten frames), the time group is converted to a line segment. This involves the object tracking means fitting a straight line to the list of space group centroid coordinates associated with the time group.

Each line segment is a straight line in (x, y, t) space. The slope of this line provides an estimate of the velocity of an object moving in the scene to which the line segment is assumed to correspond.

Just as space groups were built up into time groups, line segments are built up into lines or "trajectories" by the object tracking means. When a line segment is formed it is projected backwards in time to see if it lies close to the most recent segment of an existing trajectory. If more than one trajectory is found the closest is chosen. If no suitable trajectories are found then the line segment is made the first side of a new trajectory. When a new line segment is projected backward it is also checked to see if it intersects the boundaries of the scene. If so an "entrance" has occurred and a new trajectory is started. Likewise the most recent side of each existing trajectory is projected forward in time to se if it intersects a boundary. If it does an "exit" has occurred and the trajectory is terminated and excluded from further consideration. When matching a line segment to a trajectory, a test is also carried out to see if the concatenation involves an unrealistically high acceleration. If so the concatenation is abandoned.

It will thus be understood that a trajectory represents the movement of an object and also consists of a series of line segments. Each line segment corresponds to a time group. The length of the time group will vary depending on the number of frames for which the time group persisted. In the preferred embodiment, time groups which persist for three or less frames are discarded on the assumption that if they do not persist for a sufficient time they cannot relate to a moving object. The length of each time group is capped at ten frames. The number of frames chosen as the maximum length for each time group is chosen in dependence of two factors:

(1) the number of centroids which are used to produce a line segment and hence the extent to which the line segment correctly approximates the position of the centroids; and (2) the smoothness of the resulting trajectory.

It has been found that ten frames provides a good balance between these factors. However, the choice of frames will be dependent on the application. For example, if many images are taken of slowly moving objects, the length of the resulting line segments would have less effect on the curve of the trajectory and hence more frames could be used to make up each time group.

A trajectory tracks the motion of an individual object in the scene. At any given time, t, the spatial coordinates, (x, y), of the centroid of the object can be calculated or predicted by extrapolating the preceding line segment. This position information can be used to mark the object being tracked for display purposes or to keep a record of the movement of a particular object in the scene. It can also be transmitted from the computer in order to control another device such as an automatic pan-tilt head fitted with a second, high-resolution camera.

When objects pass one another so that their space groups temporarily coalesce then separate again, the extrapolation of line segments allows both the objects to be tracked and their separate identities maintained.

Each trajectory summarises the size, shape and kinetic behavior of a single object in the scene. The characteristics of a trajectory and/or its component line segments allow objects and behaviors to be distinguished and selectively reported. Thus trajectories with line segments having velocities above a preset threshold may indicate the presence of persons running, fighting or skateboarding. A trajectory enduring for a longer than a preset threshold time would indicate a person loitering in the scene. The size of the line segments as recorded in their spatial standard deviations is also a distinguishing characteristic and allows adults to be distinguished from children and animals, vehicles to be distinguished from people and vehicle types to be distinguished from one another.

It should be understood that the present invention is not confined to the above-described embodiment.

The term "intensity" which is used in the above description may be generalised to include any other quantifiable characteristic of an image pixel such as hue or saturation.

In a real environment the background image needs to be continually refreshed to allow for slow changes in the scene. A new background image is created every 100 frames or so, from which moving objects have been largely removed. This provides an opportunity to detect static objects that have recently appeared in the scene or disappeared from the scene. Each new background image (rather than each new comparison image) is compared by a background image comparison means with a pair of range images that have been saved some time previously. Typically the third last background image is used. In this case the process need only be taken as far as computing the line segments. That is, each background image is compared first with a background image which precedes it in time by three background images to determine changes in the scene in the intervening period. That is, the mode of each new background image is compared with the confidence limits of the old background image to determine whether there have been any changes. Each change is treated as a slow moving object. The potential slow moving objects are then matched with potential slow moving objects of preceding background images to determine whether a change has persisted over consecutive frames. Any object which persists sufficiently long enough (typically for three background images) is recognised as being a change to the scene. A changed static object in the scene will give rise a new line segment that persists in consecutive background images. The size of the static object to which it corresponds may be estimated as before, allowing parcels to be distinguished from vehicles etc.

Another problem that besets this method of image comparison is the occurrence of pixels that are noisy due to environmental reasons. For example shiny objects reflecting moving clouds, wind blown vegetation, the shadows of wind blown vegetation and the shadows of tall buildings moving with the sun's motion in the sky. The algorithms described above for constructing space groups and time groups are sufficiently robust to allow pixels to be masked with little deterioration in performance. Pixels from problem areas can be made self-masking by computing the proportion of time for which each pixel is True. On a sufficiently long time scale any given pixel should only be true for a small proportion of the time. Any that are not can be designated as "noisy" pixels and excluded from consideration when the Boolean pixel array is formed by a masking means.

Figure 6:
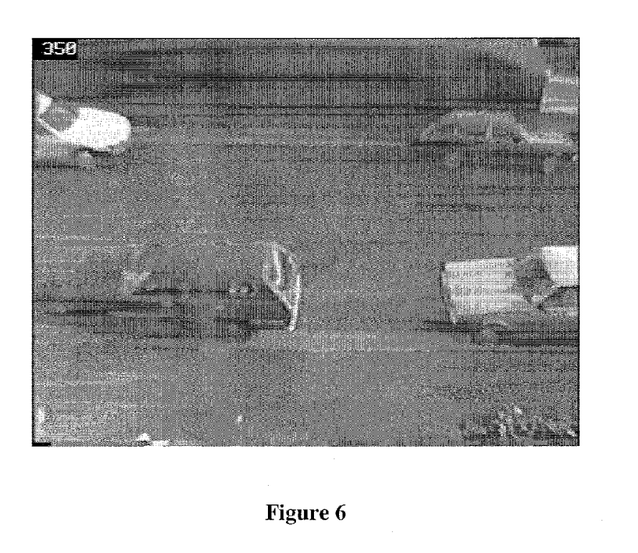
FIG. 6 shows an image of a scene in overcast conditions.
Figure 7:
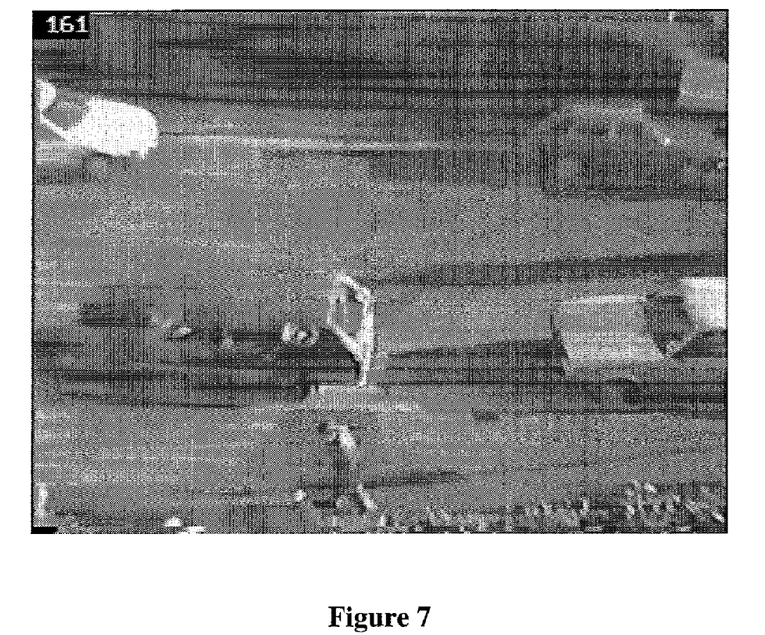
FIG. 7 shows an image of same scene in sunlit conditions and with a person in the foreground.

The second aspect of the invention relates to a high-pass spatial filtering process suitable for use in combination with the object tracking method of the first aspect of the invention. In the embodiment of the second aspect of the invention a background image shown in FIG. 6 and a current image shown in FIG. 7 were firstly converted to a new scale to give the images shown in FIGS. 8 and 9 respectives. Each image is composed of a plurality of pixels and the shading of the pixels represents their intensity value. The function used to convert the intensity value of each pixel, I, in each image to log-intensity, L, was defined as:

$L = m \log(I) + c$ for $4 \leq I < 256$ and $L = I$ for $0 \leq I < 4$ where $m = 42/\log(2)$ and $c = -80$.

The function was made linear for very small intensity values to avoid the numerical complications of large negative values of L as I approached zero. The parameters m and c were chosen so that intensity values between 4 and 255 mapped into the same range (4 to 255) for computational convenience. The conversion is made computationally efficient by computing 256 table entries only once at the outset and then finding the appropriate value of L for each pixel by table look-up.

Figure 8:
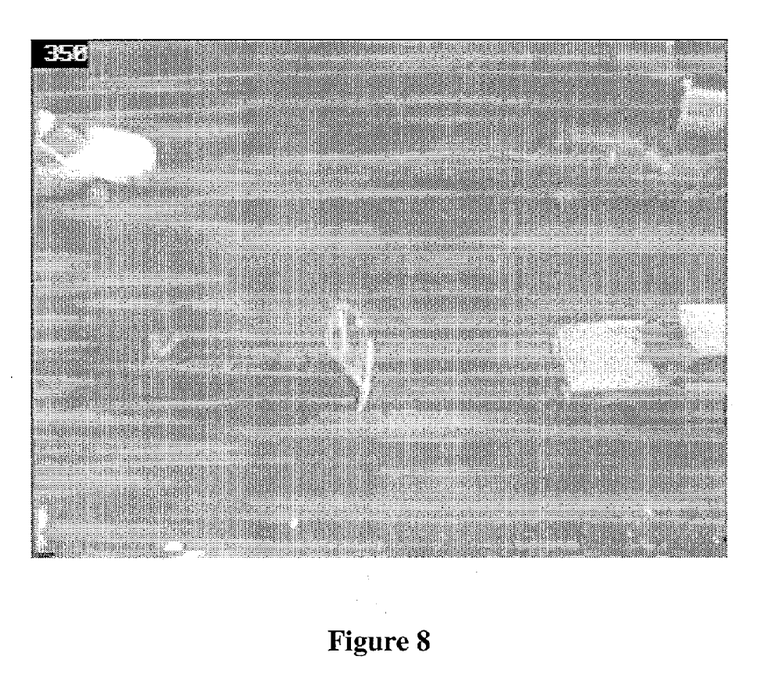
FIG. 8 shows an image which is obtained when the image of FIG. 6 is converted using a logarithmic intensity scale.
Figure 9:
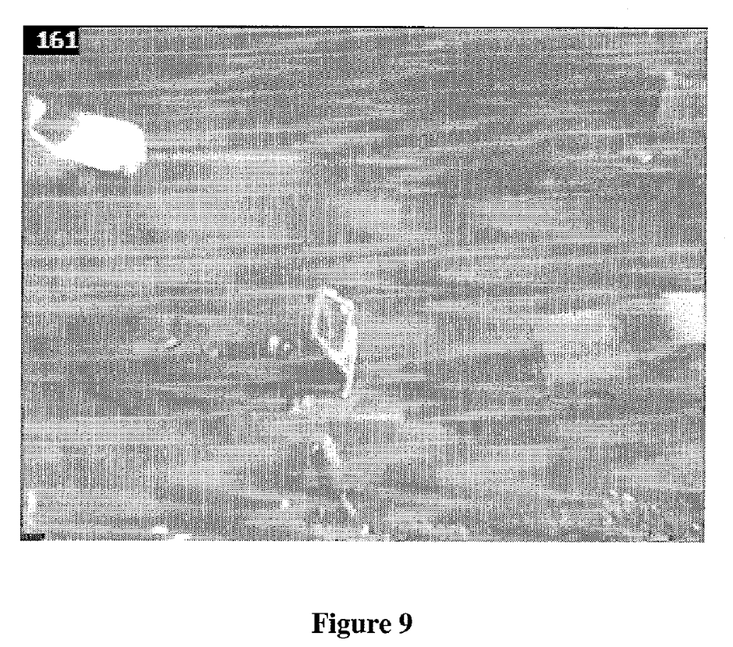
FIG. 9 shows an image obtained when the image of FIG. 7 is similarly converted.

Next the rescaled images shown in FIGS. 8 and 9 were filtered by convoluting them, firstly with filter coefficients, $a_i$, in Table 1 in the horizontal direction, and then with the filter coefficients, $b_j$, in Table 2 in the vertical direction.

TABLE 1

| $a_0$ | $a_1$ | $a_2$ | $a_3$ | $a_4$ | $a_5$ | $a_6$ | $a_7$ | $A_8$ |
|---|---|---|---|---|---|---|---|---|
| -1 | -8 | -12 | 8 | 26 | 8 | -12 | -8 | -1 |

TABLE 2

| $b_0$ | $b_1$ | $b_2$ | $b_3$ | $b_4$ | $b_5$ | $b_6$ |
|---|---|---|---|---|---|---|
| 1 | 6 | 15 | 20 | 15 | 6 | 1 |

Figure 10:
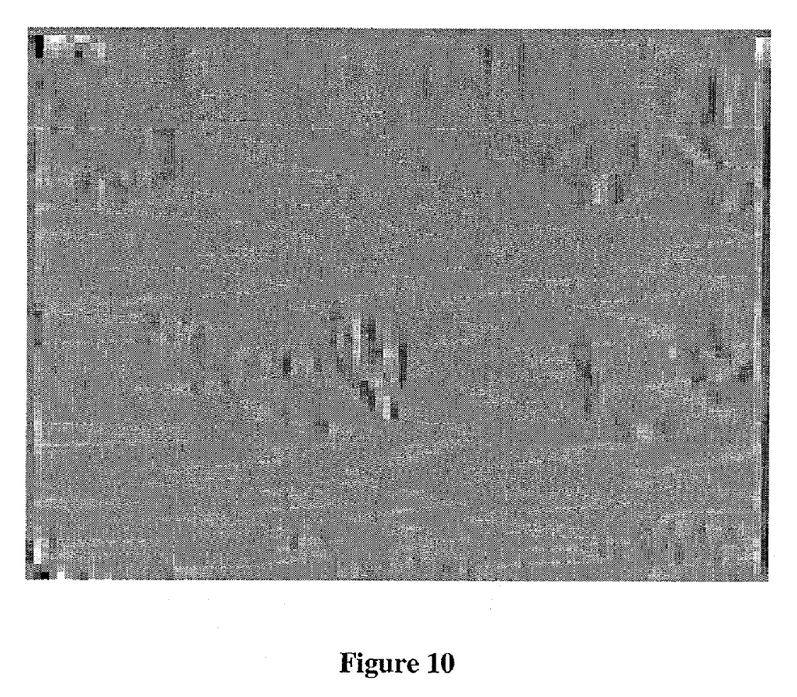
FIG. 10 shows an image obtained when the image of FIG. 8 is convoluted with a high-pass integrating filter.
Figure 11:
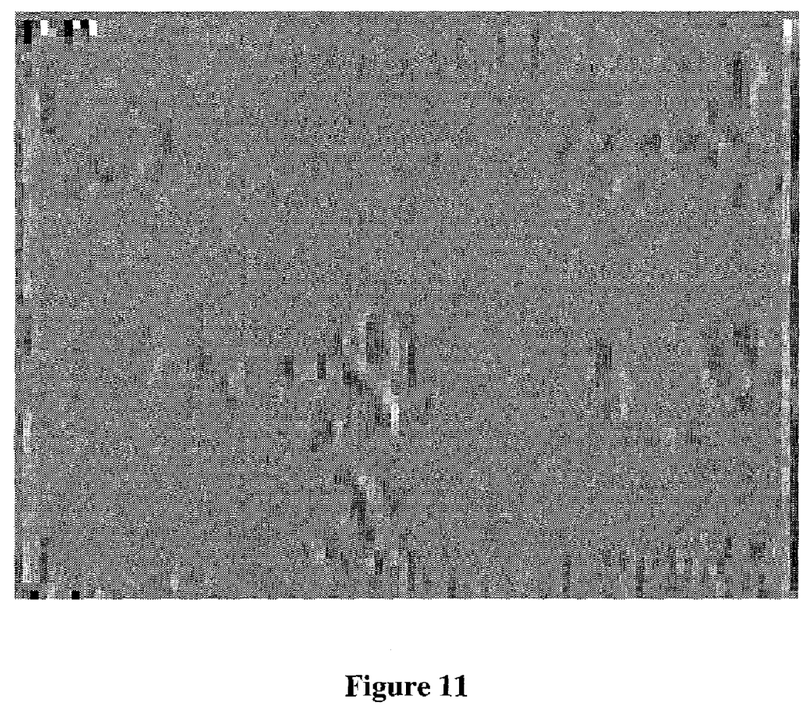
FIG. 11 shows an image obtained when the image of FIG. 9 is similarly treated.

Finally the logarithmically scaled, filtered images were decimated by 2 both horizontally and vertically to give the images shown in FIGS. 10 and 11. Because the filtering process gave rise to negative values of intensity, the intensities were adjusted to lie between 0 and 255 for display purposes. In these figures the value zero is represented by middle grey, negative values are darker than this and positive values are lighter. Comparison of FIGS. 10 and 11 shows that only real differences in the scene—i.e. due to the figure in the foreground, are apparent and that the effects of the different illumination conditions have been removed.

It should be evident from the above that this aspect of the invention stems from the realization that changing the illumination of a scene changes the intensities of differently coloured objects in the image in a constant ratio. On the other hand most image processing operations are additive and subtractive rather than multiplicative. By converting intensity, I, to the scaled logarithm of intensity, L, this difficulty is overcome. If the scene illumination increases, the values of I for each pixel should all increase by a constant ratio and it follows that the values L for each pixel should all increase by a constant increment.

In practice the illumination of different parts of a scene may not change by the same amount over the entire scene. Nevertheless objects that are close together in the scene will, in general, experience similar illumination changes. It follows that pixels that are close together in the image should take values of L that vary by the same absolute amount and that in general the differences in L between neighbouring pixels will be constant and independent of the illumination of the scene.

It follows that the logarithmic resealing of an image as described above followed by convolution with any differencing filter will give rise to a new image which is independent of the illumination of the scene. Unfortunately the simple differencing of neighbouring pixels will greatly decrease the signal to noise ratio of the image. L is always positive so that the difference, •L, is usually much less than L itself. On the other hand the variance of the camera noise is the sum of the variances of each individual pixel. In general this relative increase in noise will be intolerable.

This problem can be overcome by combining the differencing operation with an integrating operation whereby the L values of a number of neighbouring pixels are added together in order to increase the signal to noise ratio of the resulting sum. This is the major function of the convoluting filters whose coefficients are listed in Tables 1 and 2. The filter of Table 2 is purely an integrating filter. The filter of Table 1 is similar but the coefficients add to zero. Thus the z-transform has a zero at 1+0i and the Fourier transform is zero at zero frequency. This means that the filter is a broadband, high-pass filter that detects broad edges in the horizontal direction. Experiments showed that there was no need for high pass filtering in the vertical direction as well as in the horizontal direction. Such additional filters tended to exaggerate the presence of rooftops and fence lines in an undesirable way.

The use of the filters had the effect of blurring the image. This blurring allows the image to be decimated without this leading to the aliasing effects that would occur in the absence of filtering. The effects of camera vibration are also greatly reduced. Decimation in this way leads to improvements in the speed of downstream processing algorithms since there are fewer pixels to be processed in each frame.

It should be appreciated that this aspect of the invention is not limited to the above-described embodiment. In particular the filter coefficients were chosen specifically for distinguishing human scale objects positioned meters or a few tens of meters from the camera. Many other high-pass integrating filters are possible and may work better in different applications. Integration and decimation may not be desirable where high resolution is required. In well-lit environments in which intensity changes are uniform across the scene, the average log-intensity of the whole image can be subtracted from the log-intensity for each pixel and any other high-pass filtering can be dispensed with.

The filter desirably meets the following conditions:
1. Its transfer function should be zero at zero frequency i.e. at z=1+0i in the z-plane,
2. It should minimize the variance of intensity over the time coordinate relative to the variance in intensity over the spatial coordinates in order to minimize the effect of camera noise relative to the "signal", and
3. It should be well behaved and not give rise to aliasing and Gibbs effects.

Condition 1 implies that the coefficients must add to zero. Condition 2 is best achieved by having a single negative coefficient with a large absolute value balancing the remaining coefficients which all take the same small positive value. Condition 3 is best achieved by convoluting a one dimensional filter which satisfies the first two conditions with simple one dimensional Gaussian or Pascal's triangle coefficients. The convolution is carried out first in one direction and then in the other to give a two dimensional spatial filter with the desired characteristics. The order of the convolutions in the x and y directions is irrelevant.

The first and second aspects of the invention may be combined, by employing the high-pass spatial filter of the second aspect of the invention each time an image, whether that be a background image or a comparison image, is acquired. These images can thus be used as the basis of the comparison if the determination of which pixels are true and false pixels and hence to determine true and false tiles and carry out the remaining steps of the first aspect of the invention.

Herein, the embodiments of aspects of the methods of invention have been described as being carried out by a computer programmed with software written to carry out the various steps of the method. However, it will be understood that equivalent hardware could be employed to carry out the invention. Further, it will be understood that steps such as determining a characteristic value for each image element may be performed by a separate means which embodies a sub-routine and this sub-routine may be shared by other means to carry out this part of the method.

The invention claimed is:
1. A method of tracking an object moving relative to a scene, the method including:
(a) generating a background image by acquiring a plurality of images of the scene, dividing each image into a plurality of background image elements, determining a value of a characteristic of each said background image element for each image to obtain a set of values, and determining from said set of values a background value for each of said background image elements, wherein determining said background value involves determining the mode of said set of values;

(b) comparing a pair of comparison images with said background image by:
  (i) acquiring a pair of comparison images, dividing each said comparison image into a plurality of comparison image elements corresponding to respective ones of the background image elements, and determining a comparison value of said characteristic for each of said comparison image elements;
  (ii) comparing each said comparison value with said background value of said corresponding background image element to determine whether said comparison value is sufficiently similar to said background value to thereby determine whether or not each said comparison image element is sufficiently similar to the corresponding background image element; and
  (iii) determining from which comparison image elements are not sufficiently similar to the corresponding background image element which comparison image elements relate to potential objects and determining a spatial characteristic of each said potential object;

(c) matching potential objects in said pair of comparison images by comparing spatial characteristics of potential objects of a following image of said pair of comparison images with spatial characteristics of potential objects of a preceding image of said pair of comparison images to match potential objects in the following image to potential objects in the preceding image; and (d) treating each matched potential object as a moving object to thereby track the movement of each said moving object relative to said scene.

2. A method of tracking an object as claimed in claim 1, wherein determining said background value of said characteristic involves determining a range of background values, and said comparison value is determined to be sufficiently similar to said background value if said comparison value is within said range.

3. A method of tracking an object as claimed in claim 2, wherein said range of background values is determined by calculating upper and lower confidence limits about the mode of said set of values.

4. A method of tracking an object as claimed in claim 1, wherein said pair of comparison images are consecutive images in a series of comparison images and each comparison image is compared with said background image to determine which comparison image elements relate to potential objects and wherein potential objects in a following image are matched to potential objects in a plurality of preceding images before being treated as a moving object.

5. A method of tracking an object as claimed in claim 4, wherein the spatial characteristics of potential objects of a plurality of preceding images are combined to produce a combined spatial characteristic for each potential object and the spatial characteristic of the following object is compared to the combined spatial characteristic.

6. A method as claimed in claim 4, wherein the number of the plurality of preceding images is about ten.

7. A method as claimed in claim 1, wherein determining which comparison image elements relate to objects includes processing each comparison image element which is not sufficiently similar to the corresponding background image element to reduce the effect that noise has on image elements being treated as objects.

8. A method as claimed in claim 7, wherein said image elements are pixels and said pixels are grouped into tiles made up of an array of pixels so that said image is divided into a plurality of tiles, and wherein said processing involving determining whether or not the majority of comparison image elements in said tile are sufficiently similar and treating each tile which has a majority of image elements which are not sufficiently similar as an object.

9. A method as claimed in claim 8, including determining whether each said tile is sufficiently related to others of said tiles to be an object, grouping said sufficiently related tiles, and treating said sufficiently related group of tiles as said object.

10. A method as claimed in claim 1, wherein said spatial characteristic includes the centroid of the object.

11. A method as claimed in claim 10, wherein said combined spatial characteristic includes spatial standard deviations from the centroid calculated for said plurality of preceding images.

12. A method as claimed in claim 1, wherein said spatial characteristic includes a measure of the size of the object.

13. A method as claimed in claim 1, wherein objects which are not matched to objects in the preceding image are treated as potential new objects.

14. A method as claimed in claim 1, wherein objects which have been matched to objects in the preceding frame for a predetermined number of frames are converted to a line segment, by fitting a straight line between the centroids of each object.

15. A method as claimed in claim 14, wherein said line segments are joined to form trajectories showing the movement of said object across said scene, by determining whether a following line segment is sufficiently related to a preceding line element.

16. A method as claimed in claim 1, further including masking undesirable image elements by determining whether the comparison value of an image element is not sufficiently similar to the background value too frequently to relate to a moving object and excluding said unreliable image elements from further processing.

17. A method of tracking an object added to or removed from a scene, the method including:
  (a) generating a series of background images of the scene by acquiring for each background image a plurality of images of said scene, dividing each said image into a plurality of background image elements, determining a value of a characteristic of each background image element for each image to obtain a set of values and determining from said set of values a background value for each of said background image elements, wherein determining a value of a characteristic for each image element involves determining the mode of a set of values obtained for each image element from said plurality of images;
    (i) comparing each new background value with an old background value of a corresponding background image element of an old background image which precedes said new background image by a number of background images to determine whether said new value is sufficiently similar to said old value to thereby determine whether or not each new image element is sufficiently similar to the corresponding old image element;

(ii) determining from which new image elements are not sufficiently similar to the corresponding old image element which new image elements relate to potential objects and determining a spatial characteristic of each said potential object;

(b) matching potential objects in consecutive background images by comparing spatial characteristics of potential objects of a following background image of said consecutive images with spatial characteristics of potential objects of a preceding background image of said consecutive background images to match potential objects in the following image to potential objects in the preceding image; and (c) treating each matched potential object as an object added to or removed from the scene.

18. A method of tracking an object as claimed in claim 17, wherein confidence limits are assigned to each value and the value of a new background image element is sufficiently similar to the value of a corresponding old background image element if the mode of a new image element falls within the confidence limits of the old image element.

19. A method as claimed in claim 17, wherein old background images precede new background images by three background images and matched potential objects are treated as new objects if they persist for three consecutive background images.

20. Apparatus for tracking an object moving relative to a scene, the apparatus including:
   (a) image acquisition means;
   (b) background image generation means for generating a background image from a plurality of images of the scene acquired by said image acquisition means, said background image generation means dividing each image into a plurality of background image elements, determining a value of a characteristic of each said background image element for each image to obtain a set of values, and determining from said set of values a background value for each of said background image elements, wherein
   determining said background value involves determining the mode of said set of values;
   (c) image comparison means for comparing a pair of comparison images with said background image by:
      (i) dividing each image of a pair of comparison images acquired by said image acquisition means into a plurality of comparison image elements corresponding to respective ones of the background image elements, and determining a comparison value of said characteristic for each of said comparison image elements;
      (ii) comparing each said comparison value with said background value of said corresponding background image element to determine whether said comparison value is sufficiently similar to said background value to thereby determine whether or not each said comparison image element is sufficiently similar to the corresponding background image element; and
      (iii) determining from which comparison image elements are not sufficiently similar to the corresponding background image element which comparison image elements relate to potential objects and determining a spatial characteristic of each said potential object;
   (d) object matching means for matching potential objects in said pair of comparison images by comparing spatial characteristics of potential objects of a following image of said pair of comparison images with spatial characteristics of potential objects of a preceding image of said pair of comparison images to match potential objects in the following image to potential objects in the preceding image; and
   (e) object tracking means which treats each matched potential object as a moving object to thereby track the movement of each said moving object relative to said scene.

21. Apparatus for tracking an object as claimed in claim 20, wherein said background image generation mean determination of said background value of said characteristic involves determining a range of background values, and said image comparison means determines that said comparison value is sufficiently similar to said background value if said comparison value is within said range.

22. Apparatus for tracking an object as claimed in claim 21, wherein said background image generation means determines said range of background values by calculating upper and lower confidence limits about the mode of said set of values.

23. Apparatus for tracking an object as claimed in claim 20, wherein said pair of comparison images are consecutive images in a series of comparison images acquired by said image comparison means and each comparison image is compared by said image comparison means with said background image to determine which comparison image elements relate to potential objects and wherein said object matching means matches potential objects in a following image to potential objects in a plurality of preceding images and said object tracking means treats each object matched to a plurality of preceding potential objects as a moving object.

24. Apparatus for tracking an object as claimed in claim 23, wherein said object matching means combines spatial characteristics of potential objects of a plurality of preceding images to produce a combined spatial characteristic for each potential object and matches the spatial characteristic of the following object to the combined spatial characteristic.

25. Apparatus as claimed in claim 23, wherein the number of the plurality of preceding images is about ten.

26. Apparatus as claimed in claim 20, wherein said image comparison means includes noise reduction means for processing each comparison image element which is not sufficiently similar to the corresponding background image element to reduce the effect that noise has on image elements being treated as objects.

27. Apparatus as claimed in claim 26, wherein said image elements are pixels and said noise reduction means groups pixels into tiles made up of an array of pixels so that said image is divided into a plurality of tiles, and wherein said noise reduction means determines whether or not the majority of comparison image elements in said tile are sufficiently similar and said image comparison means treats each tile which has a majority of image elements which are not sufficiently similar as a potential object.

28. Apparatus as claimed in claim 27, wherein said noise reduction means determines whether each said tile is sufficiently related to others of said tiles to be an object, grouping said sufficiently related tiles, and said image comparison means treats said sufficiently related group of tiles as a potential object.

29. Apparatus as claimed in claim 20, wherein said spatial characteristic includes the centroid of the object.

30. Apparatus as claimed in claim 29, wherein said combined spatial characteristic includes spatial standard deviations from the centroid calculated for the plurality of preceding images.

31. Apparatus as claimed in claim 20, wherein said spatial characteristic includes a measure of the size of the object.

32. Apparatus as claimed in claim 20, wherein said object matching means treats objects which are not matched to objects in the preceding image as potential new objects.

33. Apparatus as claimed in claim 20, wherein said object tracking means converts objects which have been matched to objects in the preceding frame for a predetermined number of frames to a line segment, by fitting a straight line between the centroids of each object.

34. Apparatus as claimed in claim 33, wherein object tracking means joins said line segments to form trajectories showing the movement of said object across said scene, by determining whether a following line segment is sufficiently related to a preceding line element.

35. Apparatus as claimed in claim 20, further including masking means for masking undesirable image elements by determining whether the comparison value of an image element is not sufficiently similar to the background value too frequently to relate to a moving object and excluding said unreliable image elements from further processing.

36. Apparatus for tracking an object added to or removed from a scene, the apparatus including:
  (a) image acquisition means;
  (b) background image generation means for generating a series of background images of the scene, said background image generation means generating each background image from a plurality of images of said, scene acquired by said image comparison means, said background image generation means dividing each said image into a plurality of background image elements, determining a value of a characteristic of each background image element for each image to obtain a set of values and determining from said set of values a background value for each of said background image elements, wherein
  determining a value of a characteristic for each image element involves determining the mode of a set of values obtained for each image element from said plurality of images;
    (i) background comparison means for comparing each new background value with an old background value of a corresponding background image element of an old background image which precedes said new background image by a number of background images to determine whether said new value is sufficiently similar to said old value to thereby determine whether or not each new image element is sufficiently similar to the corresponding old image element;
    (ii) determining from which new image elements are not sufficiently similar to the corresponding old image element which new image elements relate to potential objects and determining a spatial characteristic of each said potential object;
  (c) object matching means for matching potential objects in consecutive background images by comparing spatial characteristics of potential objects of a following background image of said consecutive images with spatial characteristics of potential objects of a preceding background image of said consecutive background images to match potential objects in the following image to potential objects in the preceding image; and
  (d) object tracking means which treats each matched potential object as an object added to or removed from the scene.

37. Apparatus for tracking an object as claimed in claim 36, wherein said background image generation means assigns confidence limits to each value and said background comparison means determines that the value of a new background image element is sufficiently similar to the value of a corresponding old background image element if the mode of a new image element falls within the confidence limits of the old image element.

38. Apparatus as claimed in claim 36, wherein old background images precede new background images by three background images and said object tracking means treats matched potential objects as new objects if they persist for three consecutive background images.

* * * * *

UNITED STATES PATENT AND TRADEMARK OFFICE
CERTIFICATE OF CORRECTION

| | | |
|---|---|---|
| PATENT NO. | : 7,133,537 B1 | |
| APPLICATION NO. | : 09/979843 | |
| DATED | : November 7, 2006 | |
| INVENTOR(S) | : John Reid | |

It is certified that error appears in the above-identified patent and that said Letters Patent is hereby corrected as shown below:

Title Page, item (30) under Foreign Application Priority Data. Please delete "August 28, 1999" and replace with -- May 28, 1999--.

Signed and Sealed this

Twentieth Day of March, 2007

JON W. DUDAS
*Director of the United States Patent and Trademark Office*